United States Patent [19]

McGraw

[11] Patent Number: 4,935,931
[45] Date of Patent: Jun. 19, 1990

[54] LASER MODE LOCKING APPARATUS

[75] Inventor: Daninel J. McGraw, Albuquerque, N. Mex.

[73] Assignee: University of New Mexico, Albuquerque, N. Mex.

[21] Appl. No.: 317,206

[22] Filed: Feb. 28, 1989

[51] Int. Cl.[5] .................... H01S 3/098; H03F 7/00
[52] U.S. Cl. ........................ 372/18; 273/22; 307/425; 307/426; 307/427
[58] Field of Search ........................ 372/18–22; 307/425–427

[56] References Cited

U.S. PATENT DOCUMENTS

| | | | |
|---|---|---|---|
| 3,530,301 | 9/1970 | Boyd et al. | 307/427 |
| 3,646,358 | 2/1972 | Firester | 307/425 |
| 4,791,631 | 12/1988 | Baumert et al. | 372/75 |
| 4,809,291 | 2/1989 | Byer et al. | 372/75 |

OTHER PUBLICATIONS

"Methods of Passive and Active Mode Locking Using Intracavity Optical Frequency Mixing", *Optics Letters*, vol. 14, No. 1 (Jan. 1, 1989).

"Generation of Blue Light by Intracavity Frequency Mixing of the Laser and Pump Radiation of a Miniature Neodymium Alluminum Garnet Laser" by W. P. Risk, et al. *Applied Phys. Lett.*, vol. 52 (2), (1988).

"Emerging Technologies for Compact Visible Laser Sources" by Gary T. Forrest, *Miniature Optics and Lasers*, SPIE vol. 898 (1988), pp. 57–87.

"A Mirror with Intensity-Dependent Reflection Coefficient" by K. A. Stankov, *Appl. Phys.* B 45, 191–195 (1988).

"A New Mode-Locking Technique Using a Nonlinear Mirror" by K. A. Stankov et al., *Optics Communications*, vol. 66, No. 1, pp. 41–46.

"A Novel Nonlinear Optical Device for Passive Mode-Locking" by K. A. Stankov *Conference on Lasers & Electro Optics*, Apr., 1988.

"Enhancement of Optical Second Harmonic Generation by Utilizing the Dispersion of Air" J. M. Yarborough, J. Falk, C. B. Hitz, *Applied Phsy. Lett.*, vol. 18, p. 70 (1971).

"Quantum Electronics Letters-Second-Harmonic and Sum-Frequency Gernation to 4950 and 4589 Å in KTP", *IEEE Journal of Quantum Electronics*, vol. QE-24, No. 1 (Jan. 1988).

*Primary Examiner*—William L. Sikes
*Assistant Examiner*—Georgia Y. Epps
*Attorney, Agent, or Firm*—Robert W. Weig; Deborah A. Peacock; Albert Sopp

[57] ABSTRACT

The disclosure is directed to two embodiments for passive and one embodiment for active mode locking of lasers. The passive systems comprise a GaAs/GaAlAs diode laser (810 nm) pumped Nd:YAG (1964 nm) laser sharing the same optical cavity. A KTP crystal is used to produce a sum of the frequencies of the diode and Nd:YAG laser (460 nm). The KTP crystal and trichroic mirror (with a reflectivity at 810 nm less than the reflectivity at the other two wavelengths) combine to create an effective end mirror reflectivity which increases in accordance with the intensity of the pump laser wavelength (810 nm) to mode lock the system. The active embodiment uses successive sum and difference frequency generation to modulate the reflectivity of a cavity output coupling mirror in a continuous wave dye laser or external cavity diode laser. A KTP crystal is used to sum the frequencies of the 810 nm dye laser and injected pulses from a Nd:YAG (1064 nm) laser which mode lock the dye laser by periodically increasing the reflectivity of its output coupling mirror, the reflectivity of which is responsive to the intensity of light thereon.

6 Claims, 1 Drawing Sheet

LASER MODE LOCKING APPARATUS

BACKGROUND OF THE INVENTION

1. Cross Reference to a Related Application:

A related application entitled LASER MODE LOCKING METHOD AND APPARATUS, U.S. Ser. No. 317,207, to Daniel J. McGraw, is being filed concurrently herewith, and the specification thereof is incorporated herein by reference.

2. Field of the Invention:

The invention relates to a method and apparatus for locking lasers using passive and active systems.

3. Description of the Related Art:

Various lasers have been mode locked in a number of ways in the past. Recently it has become possible to mode lock solid state lasers such as Neodymium: Yttrium Aluminum Garnet (Nd:YAG) lasers, as disclosed in "A Mirror with Intensity—Dependent Reflection Coefficient" by K. A. Stankov (1986-87). This paper describes how a nonlinear optical crystal-mirror combination acts like a mirror whose reflectivity at the fundamental frequency increases with intensity. The second harmonic generation crystal is followed by a mirror that has a low reflectivity ($R_1$) at the fundamental frequency and a high reflectivity ($R_2$) at the second harmonic. The distance between the crystal and the end mirror is adjusted so that the dispersion of air creates a half wave phase shift between the fundamental and second harmonic. This phase shift, as was shown in J. M. Yarborough, J. Falk, C. B. Hitz, *Applied Phys. Lett.* Vol. 18, p. 70 (1970), causes a reverse in the direction of energy transfer on the second pass through the crystal, and the second harmonic is converted back to the fundamental. Thus, as the intensity at the fundamental frequency increases, starting at zero, the conversion efficiency to the second harmonic frequency increases from zero to near 100%, which causes the reflectivity of the crystal mirror combination to increase from $R_1$ to a value near $R_2$.

"A New Mode Locking Technique Using A Non-linear Mirror" by K. A. Stankov and J. Jethwa (1986-88) and "A Novel Nonlinear Optical Device for Passive Mode Locking" by K. A. Stankov (Apr. 1988) each recognize that a mirror whose reflectivity increases with intensity can be used to provide passive mode locking. Stankov demonstrates that it is possible to passively mode lock a high peak power Q-switched Nd:YAG laser using a crystal and mirror combination. However, this structure of Stankov's nonlinear mirror precludes its use in mode locking low average power lasers such as continuous wave Nd:YAG and diode lasers. The basic problem with Stankov's design is that in order to achieve mode locking, there must be a significantly large intensity dependent modulation of the reflectivity ($\Delta R$) of the mirror. However, two conditions that must be simultaneously maintained to achieve a large $\Delta R$ are mutually exclusive conditions in the context of Stankov's design. Both conditions cannot be simultaneously satisfied and in the Stankov design the failure to satisfy either condition prevents mode locking in all except very high power lasers. The two conditions required for large $\Delta R$ are (a) that $R_1$ be much less than $R_2$; and (b) that a high intra-cavity power at the fundamental frequency be maintained to generate a significant conversion efficiency to the second harmonic which produces the large $\Delta R$. Condition (a) requires a high output coupling for the fundamental frequency and so prevents a large buildup of the intra-cavity power at the fundamental frequency. Similarly, satisfying condition (b) requires violating condition (a).

Essentially, Stankov mode locks a laser by using intra-cavity second harmonic generation to generate an effective cavity mirror, the reflectivity of which is an increasing function of the intensity at the fundamental frequency. This necessitates the use of a relatively high power pumping laser since the reflectivity of the mirror increases roughly proportional to the square of the second harmonic conversion efficiency. Stankov found experimentally that a 2% to 3% continuous wave conversion to the second harmonic was required to cause passive mode locking to occur. The Stankov system will simply not work with moderate or low intensity lasers where typical conversion efficiencies are less than $10^{-4}$.

Although sum frequency generation mode locking in accordance with the invention at first blush may appear similar to Stankov's, closer inspection reveals that it is fundamentally different in that conditions (a) and (b) can be and are simultaneously satisfied when practicing the invention. This is because in practicing the invention the conversion efficiency from a fundamental frequency, e.g., ($\lambda_1 = 810$ nm), to a sum frequency, e.g., ($\lambda_3 = 460$ nm), does not depend on the intensity at the fundamental frequency. The conversion efficiency instead novelly depends on the intensity at the second lasing frequency ($\lambda_2 = 1064$ nm). The two above-mentioned conditions can, in accordance with the invention, then be easily satisfied: (a) $R_1 << R_2$ and $R_1 << R_3$; and (b) high conversion efficiency (yielding high $\Delta R_1$) is achieved by maintaining a high intra-cavity intensity at $\lambda_2 = 1064$ nm. These two conditions can be simultaneously achieved by taking $R_2 \simeq 1.0$. In practicing the invention, currently available single stripe diode lasers used in a diode pumped Nd:YAG laser can yield a $\Delta R$ greater than 10%. This is significantly larger than the 2% to 3% value Stankov found experimentally as the threshold for the onset of passive mode locking.

SUMMARY OF THE INVENTION

In accordance with the invention, there is provided a method, within an optical cavity, for passively mode locking a first laser pumped second laser. The method comprises the steps of emitting a first light beam from the first laser at a first frequency to produce a second light lasing in the second laser at a second frequency, and selectively reflecting light at least one of the ends of the cavity in accordance with a light beam which comprises a sum frequency of the first and second frequencies to produce a passively mode locked parametrically generated lasing light beam comprising the sum frequency and the first and second frequencies. The invention preferably further comprises the step of adjusting the phase difference between the sum of the phases of the first and second beams and the phase of the sum frequency, $\Delta \phi = \phi_1 + \phi_2 - \phi_3$, after the frequency summing step. Frequency summing can be accomplished by using a KTP crystal.

There is further provided a method for, within an optical cavity, passive mode locking a diode laser pumped Nd:YAG laser comprising the steps of lasing a light beam from a diode laser at a first frequency to produce a second light beam lasing in a Nd:YAG laser at a second frequency, and selectively reflecting light at least one of the ends of the cavity in accordance with a light beam comprising a sum frequency of the light beams having the first and second frequencies to produce a passively mode locked lasing light beam comprising the sum frequency. The method further comprises the step of adjusting the phase difference, $\Delta\phi$, from $\Delta\phi=+\pi/2$ to $\Delta\phi=-\pi/2$, after the frequency summing step. Frequency summing can be accomplished by using a potassium titanyl phosphate (KTP) crystal. The method is particularly adaptable for passive mode locking a diode laser pumped Nd:YAG laser, the diode laser preferably comprising a relatively high power GaAs/GaAlAs diode laser, such as one which lases at approximately 810 nm, the Nd:YAG laser lasing at approximately 1064 nm and the sum frequency produced being at approximately 460 nm.

The invention also comprises an apparatus for, within an optical cavity, passively mode locking a first laser pumped second laser. The apparatus comprises: a first structure for lasing a light beam at a first frequency., a second structure for lasing a light beam at a second frequency; structure, such as a KTP crystal, for summing the light beams lased by the first and second structures to produce a frequency up converted amplified light beam at a sum frequency; and structure for selectively reflecting light at least one of the ends of the cavity in accordance with the sum frequency light beam to produce a passively mode locked parametrically amplified light beam comprising the sum frequency.

There is provided an apparatus for, within an optical cavity, passively mode locking a diode laser pumped Nd:YAG laser comprising: diode laser means for producing a light beam lased at a first frequency; Nd:YAG laser means for producing a light beam lased at a second frequency; structure for summing the light beams lased by the diode and Nd:YAG lasing means to produce a parametrically amplified light beam at a sum frequency; and structure for selectively reflecting light at least one of the ends of the cavity in accordance with the sum frequency light beam to produce a passively mode locked parametrically amplified light beam comprising the sum frequency. The apparatus further comprises structure for adjusting the phase difference $\Delta\phi$ between the first and second passes through the crystal. The apparatus can comprise a diode laser pumped Nd:YAG laser and preferably comprises structure for adjusting the phase difference $\Delta\phi$, such as a dispersive glass slab. The diode laser can comprise a relatively high power GaAs/GaAlAs diode laser which lases at approximately 810 nm, the Nd:YAG laser lasing at approximately 1064 nm and the sum frequency produced being approximately 460 nm.

The invention additionally comprises an active mode locked laser apparatus comprising: a first continuous wave mode locked lasing structure for lasing a first beam of light at a first frequency., a second continuous wave lasing structure for lasing a second beam of light at a second frequency., structure for pumping the second lasing structure with the first lasing structure; structure for mixing the first and second beams to generate a third light beam at a sum frequency comprising the first and second frequencies; structure for generating a fourth light beam having a frequency comprising the difference between the third sum frequency and the first frequency, the fourth frequency being about the same frequency as the second frequency., and structure for providing end of cavity reflectivity in accordance with the intensity of the second and fourth frequencies within the light beams to produce mode locked pulses.

The first lasing structure can comprise a continuous wave mode locked Nd:YAG laser and the second lasing structure can comprise a dye laser structure, the ND:YAG ion lasing structure lasing at approximately 1064 nm and the dye laser structure lasing at approximately 810 nm, whereby the sum frequency comprises approximately 460 nm and the difference frequency comprises approximately 810 nm. The mixing structure can comprise a KTP crystal. A half wave dispersion device is preferably provided for phase adjustment.

One object of the invention is to mode lock a laser.

Another object of the present invention is to provide mode locking for solid state blue light lasers.

Yet another object of the invention is to provide mode locking for both passive and active laser systems.

One advantage of the present invention is that relatively low power lasers can be mode locked.

Another advantage of the present invention is that a relatively low power laser, such as a diode laser, used to pump an Nd:YAG laser can be mode locked.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention.

DETAILED DESCRIPTION OF THE INVENTION

Figure 1:
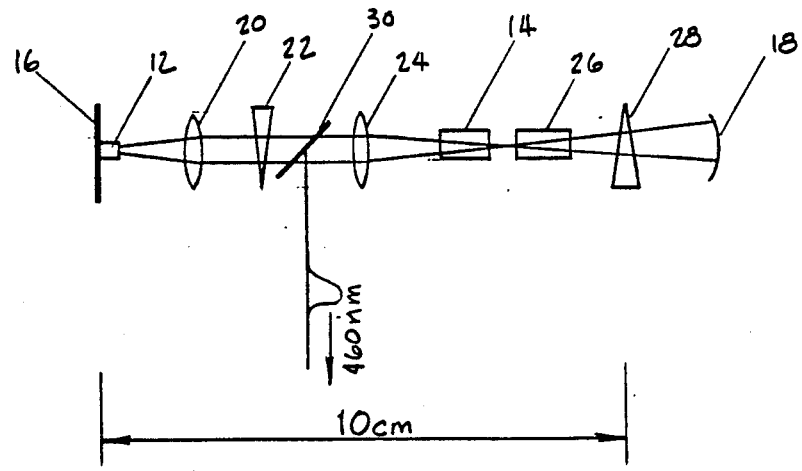
FIG. 1 illustrates a preferred embodiment of a passive apparatus in accordance with the invention.

Reference is now made to FIG. 1 which shows a preferred embodiment of the apparatus for passive mode locking a laser. As seen therein, a relatively high power, e.g., on the order of approximately 500 milliwatts, continuous wave, single stripe GaAs/GaAlAs diode laser 12 pumps a 5 mm long, 2 mm wide, 1% doped Nd:YAG laser crystal 14. Other lasers which can be used in practicing the various embodiments of the invention in place of Nd:YAG (1.06$\mu$) are Nd:Glass (1.06$\mu$) and Nd:YLF (1.05$\mu$). In general, other lasers can be used as long as they meet the following criteria: (1) the emission wavelength of the high gain pump laser coincides with strong absorption into the upper lasing state of the pumped second laser and (2) a suitable nonlinear optical material is available to convert the first lasing frequency and the second lasing frequency to their sum frequency with high conversion efficiency and broad phase matching band width. These conditions are met with the GaAs . Nd:YAG . KTP combination of the preferred embodiment. In the preferred embodiment, the diode laser 12 produces an output at 810 nm ($\lambda_1$) and the Nd:YAG laser produces an output at 1064 nm ($\lambda_2$). Both lasers 12 and 14 are disposed in the same cavity defined by a highly reflective coating 16 on the back of diode laser 12 and a cavity end mirror 18. The lasers do not have to be in the same cavity. Two matched cavities can be used if they are matched in length and overlap at the Nd:YAG crystal and the KTP crystal. The preferred embodiment of the invention uses parametric generation in a non-linear crystal to provide a mirror, having a reflectivity increasing with the intensity of light impinging thereon. All other surfaces within the cavity are anti-reflection coated for both laser wavelengths, i.e., 810 nm and 1064 nm. Anamorphic focusing optics 20 and 24 are used to focus the output of the diode laser 12 into the Nd:YAG laser 14. The collimating lenses 20 and 24 in the preferred embodiment can be microscope objective focusing lenses or gradient index rods. Translatable glass wedges 22 and 28, which can be a Bk-7, $\phi=30$ mrad, with anti-refractive coatings on both sides for 810, 1064 and 460 nm, are used for phase adjustments between $\lambda_1$ and $\lambda_2$. Alternatively, a rotatable glass plate can be used as a path length change device. Between 10% and 50% of the 810 nm pump radiation from diode laser 12 passes through Nd:YAG laser 14, which, with the Nd:YAG emission, mix in a type II noncritically phase matched KTP crystal 26 to generate a sum frequency beam having a wavelength of $\lambda_3$ in the blue spectral region at approximately 460 nm. Those skilled in the art will appreciate that doping percentage and crystal length can be varied to adjust 810 nm transmission to optimize conversion efficiency to suit various uses. Too, although KTP is best for the wavelengths used in the preferred embodiment, other materials will be suitable for use with other lasers. One such material is $\beta$-barium borate. All of the blue (460 nm) and Nd:YAG (1064 nm) and some of the diode light (810 nm) reflect from end mirror 18 and after suitable half wave dispersion from glass wedge 28 mix, again in the KTP crystal 26, to parametrically amplify the diode laser wavelength (810 nm). The crystal 26 and mirror 18 combination has a reflectivity for 810 nm of $R_1 = R_1^{(0)} + 14.2 l^2 P_2^1$, where $P_2$ is the Nd:YAG intra-cavity intensity in watts and $l$ is crystal length in meters, where $\Delta R_2$ is maximized by minimizing any intra-cavity loss at $\lambda_2$ (1064 nm) keeping $P_2$ at approximately 10 watts. $P_2$ is pumped by $P_1$ and therefore is a monotonically increasing function of $P_1$. $R_1$ is also an increasing function of $P_1$, leading to the mode locking of the diode laser output. Mode locking the diode laser 12 mode locks the Nd:YAG laser 14 and thereby enhances generation of the blue 460 nm light. Because of the high peak powers within the mode locked laser, the efficiency of blue light generation is greatly enhanced over continuous wave operation and the blue light can be strongly outcoupled through a beam splitter 30 without affecting the mode locking. In the preferred embodiment illustrated, the beam splitter 30 is a trichroic 45 degree beam splitter with a high transmissivity at 1064 nm (S-polarization), 810 nm (P-polarization), and high reflectivity at 460 nm at S-polarization. The whole cavity length in the preferred embodiment can be as small as 10 cm.

The sum frequency ($\lambda_3$) generated in the preferred embodiment of FIG. 1 is between the lasing wavelength ($\lambda_2$) and its pump radiation ($\lambda_1$). $\lambda_1$ and $\lambda_2$ share the same cavity and both wavelengths are passively mode locked by novelly causing the reflectivity of the outcoupling mirror 18 for the pump wavelength to depend indirectly through $P_2$ on the pump intensity. It is this indirect relationship in accordance with the invention that provides both the high intra-cavity intensity at the lasing wavelength ($\lambda_2$) and the large outcoupling of the pump radiation ($\lambda_1$) Together they create a large modulation depth of reflectivity for the pump radiation, thereby causing passive mode locking to take place and the sum frequency-mode locked blue pulses to be generated with high efficiency.

Figure 2:
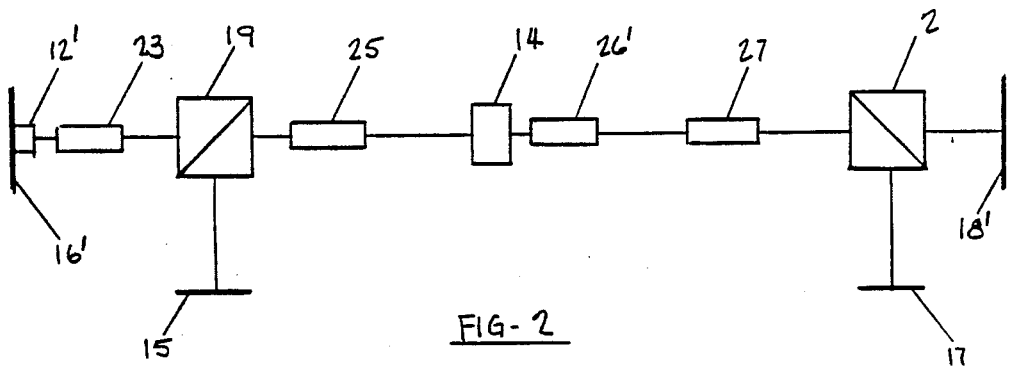
FIG. 2 depicts a second passive embodiment.

Reference is now made to FIG. 2, which shows an alternative embodiment for a passively mode locked system. The primary difference between the FIG. 2 embodiment and the FIG. 1 embodiment is that separate end mirrors 15 and 17 are employed. Mirror 16' and 18' are the end mirrors for the P-polarized 810 nm light. For the S-polarized light at 1064 nm and at 460 nm, mirrors 15 and 17 are provided. Separation of cavities for the P-polarized and S-polarized wavelength can be accomplished because the type-II phase matching in the KTP crystal 26' requires that the 1064 nm and 460 nm light be polarized orthogonally to the 810 nm light. Thus, separation of the 810 nm wavelength light from the 460 nm and 1064 nm wavelength lights is accomplished using broad band prism polarizers 19 and 21 which prevent absorption loss at the diode laser 12'. The polarizers separate the 810 nm wavelength from the other two wavelengths because of the different polarizations caused by the specific Type II phase matching done in the KTP. One could also separate the wavelengths by simply dispersing them with a prism, but this would require three mirrors. Prism polarizers 19 and 21 also eliminate the need for triple stack trichroic mirror coatings and provide for half-wave dispersion to be introduced by moving the mirror 17, rather than by introducing a dispersive optical element, such as glass wedge 28 as used in FIG. 1. The primed elements in FIG. 2 correspond to the unprimed elements in FIG. 1 and other components are as follows: a diode laser anamorphic collimating optics and a gradient index rod are represented by block 23, a gradient index focusing rod having a quarter pitch is represented by block 25, as well as by block 27. The cavity end mirror 18' is for $\lambda_2$ and has a low reflectivity $R_2 < R_3$ where $R_3$ is approximately equal to 1. The cavity end mirror 17 has a reflectivity of less than about 1.0 for 1064 nm and 459 nm. The cavity end mirror 15 is for $\lambda_1$ and $\lambda_3$ and provides an output coupling for the blue having a reflectivity of less than about 1.0 for 1064 nm and a reflectivity of approximately 0.2 for 459 nm. Diode laser 12' is similar to the one of FIG. 1 as is YAG laser 14'.

The difference between the two passive mode locked embodiments depicted in FIGS. 1 and 2 is that in FIG. 1, all three wavelengths share the same cavity end mirrors, whereas in FIG. 2, broadband prism polarizers are used to separate the p-polarized 810 nm light from the other two wavelengths. Thus., in FIG. 2, the 810 nm light uses a different end mirror than do the other two wavelengths. This avoids loss and absorptive heating in the diode laser by the 1064 nm light and provides for adjustment of the phase condition by moving either of the end mirrors 15 and 17. In the preferred embodiment of FIG. 1, using suitable trichroic end mirrors 16 and 18, the three wavelengths share the same mirror at the nonlinear mirror 18 end of the cavity, to enhance insensitivity to vibrations, and use two separate mirrors at the diode laser end of the cavity to avoid 1064 nm absorptive losses.

Figure 3:
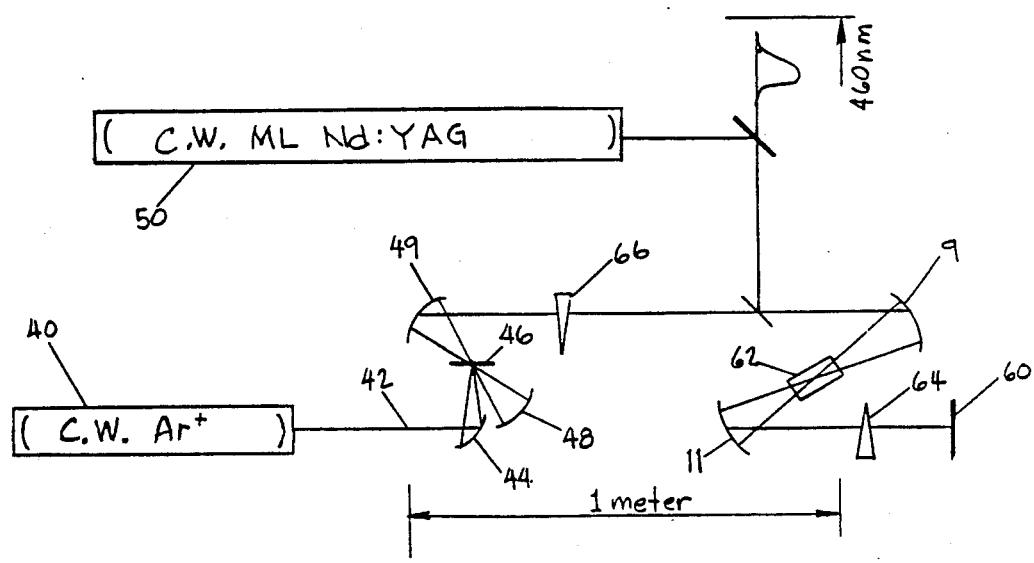
FIG. 3 schematically shows an active apparatus in accordance with the invention.

FIG. 3 shows an active system using parametric generation to modulate the reflectivity of a cavity output coupling mirror where the modulation depth does not depend on the intra-cavity power at a fundamental wavelength. As seen therein a continuous wave argon ion laser 40 pumps a continuous wave dye laser 42 as represented by a pump focusing mirror 44, dye jet 46 which in the preferred embodiment comprises a styrl 9 dye, and second and third cavity end mirrors 48 and 49 having high reflectivity at 810 nm. Other lasers, such as frequency doubled Nd:YAG, Nitrogen, and Krypton lasers, can be used to continuously pump a styrl #9 dye laser. The cavity length of the dye laser 42 is matched to that of the Nd:YAG laser 50 from which 1064 nm ($\lambda_2$) injected pulses mode lock the dye laser by periodically increasing the reflectivity of the output coupling mirror 60 for the dye laser wavelength of 810 nm. An injected pulse of $\lambda_2$ at 1064 nm and one at the dye laser wavelength of $\lambda_1$ at 810 nm mix in a non-linear optical KTP crystal 62 to generate a sum frequency ($\omega_3 = \omega_1 + \omega_2$). In a preferred embodiment, the KTP crystal 62 is a 5 mm×2 mm×2 mm crystal, having its y-axis parallel to the 5 mm side. The end faces are anti-reflective coated and there is 90° noncritical phase matching. The sum wavelength ($\lambda_3$), is 460 nm in the preferred embodiment, and the injected pulses, are totally reflected at mirror 60 and on passing back through crystal 62 generate their difference frequency ($\omega_2 = \omega_3 - \omega_1$). This difference frequency ($\omega_2$) is the dye laser frequency (810 nm). Thus, the injected 1064 nm pulses serve as a parametric pump for the 810 nm radiation. The effective reflectivity of the crystal-mirror combination for 810 nm light is: $R_1^{eff} = R_1^{(0)} + 14.2 l^2 P_2^2$, where optimal focusing in KTP and nondepletion of the pump intensity is assumed. $P_2$ is the pump intensity in watts and $l$ is the crystal length in meters.

The laser generates synchronized mode locked pulses at both the dye laser wavelength and the sum frequency. Uniquely, the change in reflectivity ($\Delta R_1$) caused by the parametric generation does not depend on the intra-cavity power, as in the prior art Stankov device, at the fundamental wavelength of 810 nm. The invention provides for the use of low average power gain media, such as diode lasers, to be mode locked. As the emission peak of the GaAs/GaAlAs diode lasers is at 810 nm, the invention provides a means for simultaneously mode locking and shifting into the visible spectrum an external cavity GaAs/GaAlAs diode laser. A glass wedge 64 is inserted between the KTP crystal 62 and the outcoupling mirror 60 to introduce a half-wave of dispersion between the sum frequency ($\omega_3$) and the sum of the other two frequencies between the first and second passes through the crystal. By introducing a variable thickness of glass, the phase condition, $\phi_3 - (\phi_1 + \phi_2) = +\pi/2$, following sum frequency generation is adjusted to $\phi_3 - (\phi + \phi_2) = -\pi/2$, thereby allowing difference frequency generation. A second glass wedge 66 is adjusted so that any recirculating light at the sum frequency satisfies the condition $\phi_3 - (\phi_1 + \phi_2) = \pi/2$ for parametric amplification. Adjusting wedge 66 makes the cavity doubly resonant both at $\omega_3$ and at the sum, $\omega_1 + \omega_2$.

Those skilled in the art will appreciate that although the various embodiments of the invention have been discussed with reference to particular laser wavelengths, the invention can be constructed using other lasers of suitable wavelengths where suitable gain media optics and nonlinear crystals are available.

The invention has been described in detail with particular reference to a preferred embodiment thereof, but it will be understood that variations and modifications can be effected within the scope of the invention.

What is claimed is:

1. An active mode locked laser apparatus comprising:
   first continuous wave mode locked laser means for lasing a first beam of light at a first frequency;
   second continuous wave laser means comprising a cavity for lasing a second beam of light at a second frequency;
   means for controlling the reflectivity of at least one end of said second laser means cavity in accordance with the intensity of the beam of said first lasing means;
   means for mixing said first and second beams to generate a third light beam at a sum frequency comprising said first and second frequencies;
   means for generating a fourth light beam having a frequency comprising the difference between said third sum frequency and said first frequency, said fourth frequency being about the same frequency as said second frequency. and
   means for providing end of cavity reflectivity in accordance with the intensity of said second and fourth frequencies within said light beams to produce mode locked pulses.

2. The invention of claim 1 wherein said first laser means comprises ND:YAG laser means.

3. The invention of claim 2 wherein said second laser means comprises diode laser means.

4. The invention of claim 3 wherein said Nd:YAG lasing means lases at approximately 1064 nm and said dye laser means lases at approximately 810 nm, whereby said sum frequency comprises approximately 460 nm and said difference frequency comprises approximately 810 nm.

5. The invention of claim 2 wherein said mixing means comprises a potassium titanyl phosphate crystal.

6. The invention of claim 5 further comprising half wave dispersion means for phase adjustment.

* * * * *

UNITED STATES PATENT AND TRADEMARK OFFICE
CERTIFICATE OF CORRECTION

PATENT NO. : 4,935,931

DATED : June 19, 1990

INVENTOR(S) : Daniel J. McGraw

It is certified that error appears in the above-identified patent and that said Letters Patent is hereby corrected as shown below:

On the title page:

At field [75] delete the entire entry and insert therefor

--Inventor: Daniel J. McGraw, Albuquerque, N.M.--.

Signed and Sealed this

Fourteenth Day of July, 1992

Attest:

DOUGLAS B. COMER

*Attesting Officer*   *Acting Commissioner of Patents and Trademarks*